(12) United States Patent
Lung et al.

(10) Patent No.: US 6,532,230 B1
(45) Date of Patent: *Mar. 11, 2003

(54) MIXED-MEDIA COMMUNICATION APPARATUS AND METHOD

(75) Inventors: En-Kuang Lung, Fremont, CA (US); Donggun Keung, Milpitas, CA (US); Leo Liu, Palo Alto, CA (US)

(73) Assignee: Altigen Communications, Inc., Fremont, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 165 days.

(21) Appl. No.: 08/818,390

(22) Filed: Mar. 14, 1997

Related U.S. Application Data

(60) Provisional application No. 60/021,368, filed on Jul. 8, 1996.

(51) Int. Cl.[7] .................................. H04M 3/50
(52) U.S. Cl. ...................... 370/352; 370/260; 370/353; 379/67; 379/89
(58) Field of Search ................................ 370/259, 260, 370/265, 351, 352, 353, 354; 395/200.3, 200.31, 200.32, 200.33; 379/67, 88, 89, 202; 709/202, 204, 221

(56) References Cited

U.S. PATENT DOCUMENTS

| | | | | |
|---|---|---|---|---|
| 5,333,266 A | * | 7/1994 | Boaz et al. ................. | 395/200 |
| 5,479,411 A | * | 12/1995 | Klein ......................... | 370/265 |
| 5,557,659 A | * | 9/1996 | Hyde-Thomson ............ | 379/88 |
| 5,568,540 A | * | 10/1996 | Greco et al. .................. | 379/89 |
| 5,604,737 A | * | 2/1997 | Iwami et al. ................ | 370/260 |
| 5,608,786 A | * | 3/1997 | Gordon ....................... | 379/100 |
| 5,726,984 A | * | 3/1998 | Kubler ....................... | 370/338 |
| 5,742,596 A | * | 4/1998 | Baratz et al. ............... | 370/352 |
| 5,764,901 A | * | 6/1998 | Skarbo et al. ........... | 395/200.3 |
| 6,091,721 A | * | 7/2000 | Greenberg et al. .......... | 370/352 |

OTHER PUBLICATIONS

Rangan et al., Communication Architectures and Algorithms for Media Mixing in Multimedia Conferences, IEEE, pp. 1–20, 1993.*

Low, The Internet Telephony Red Herring, Hewlett–Packard Laboratories, pp. 1–15, 1996.*

Yang, "INETPhone: Telephone Services and Servers on Internet", University of North Texas, pp. 1–6, Apr. 1995.*

* cited by examiner

Primary Examiner—Wellington Chin
Assistant Examiner—Frank Duong
(74) Attorney, Agent, or Firm—Townsend & Townsend & Crew LLP

(57) ABSTRACT

A method for recording mixed-media messages using an integrated messaging server in response to a client application, the integrated messaging server including a processor coupled to a telephone switching server, to a storage, and to a message server, includes the steps of receiving a voice message using a handset coupled with an analog line to the telephone switching server, storing the voice message in the storage, receiving a document from the client application using the message server, and associating the voice message with the document to form a mixed-media message.

28 Claims, 10 Drawing Sheets

MIXED-MEDIA COMMUNICATION APPARATUS AND METHOD

CROSS REFERENCE TO RELATED APPLICATIONS

This application claims priority to Provisional Application Serial No. 60/021,368 filed Jul. 8, 1996, and incorporates it by reference for all purposes.

BACKGROUND OF THE INVENTION

The present invention relates to apparatus and methods for communicating messages across computer networks. More specifically, the present invention relates to apparatus and methods for recording mixed-media messages and transmitting messages across computer networks such as the Internet.

Private Branch Exchange

The term Private Branch Exchange (PBX) refers generically to local telephone switching systems. PBX systems and central office telephone systems are well known in the art and are available from companies such as AT&T, Mitel Corporation, Northern Telecom, and others. PBX systems typically are coupled to a telephone trunk-line and provide service to internal telephone lines (extensions).

As has been the situation up to now, businesses have traditionally purchased stand-alone monolithic switching systems to provide internal and external telephone service to its workers. Because it has been difficult to expand and to add functionality to these established switching systems, businesses have been forced to buy separate stand-alone servers to increase functionality. Common examples of some of the functionality provided by stand-alone servers include auto-attendant servers, voice-mail servers, etc. Because of the closed nature of these stand-alone servers, it has also been difficult for businesses to upgrade these stand-alone servers.

Telephone related servers have thus been costly and difficult to maintain and expand.

Internet Phones

The prospect of consumers making a long distance call for the price of a local call has spawned the market for Internet-based telephony. There are two current techniques enabling consumers to make calls over the Internet.

One technique for internet-based telephony requires both the sending individual and the receiving individual to be connected to the internet, and require the receiver to have a known internet address. Typically the sender types-in the receiver's known internet address, connects to the receivers computer across the internet, and when connection is made, talks to the receiver. This technique has several draw-backs, for example, individual users typically do not have their own unique internet address. Since individual users typically connect to the internet through an internet service provider (ISP), only when the user connects, will she have a dynamically assigned internet address. Thus, in order for another individual to contact her, she must somehow transmit the dynamically assigned internet address to the calling party and then await being contacted. With this technique the call must be pre-arraigned, and is limited to person to person calls. Another drawback is that the sender and the receiver need to be equipped with multimedia computers (as will be described below).

Another technique for internet-based telephony again requires both parties to be connected to the internet. Initially, both parties connect to a particular host site. This host site then provides both parties with a list of users coupled to that site, such as a conventional chat room. One party then selects the other party's name from the list of names and then makes the connection. This technique has several draw-backs including that the users must rely on a third party host site in order to make contact with each other. Another drawback is that since both parties must actively contact the site before talking to each other, the call must be pre-arraigned.

No viable solutions have been proposed thus far which provide businesses with the capability to utilize Internet-based telephony.

Multimedia Computers

Multimedia computers are typically defined as computers having digital sound boards, speakers, microphones, CD-ROMS, etc. These components enable users to record and play-back sounds, images, etc. through the computer, among other functions.

In the business environment, audio input devices such as speaker phones or computer microphones are seldom used because most users work in cubicles with low partition walls. Since these types of input devices require a user to speak aloud, co-workers in adjacent cubicles may be disturbed. Audio output devices such as speaker phones and computer speakers are seldom used because of the same type of problem. Further, audio output devices often lead to productivity drops because of the fondness of users for entertainment programs.

Further, in the business environment, multimedia computers are seldom ordered or used because of the increased cost of equipping a computer with multimedia capability. Although the difference in price between multimedia equipped computers and non-multimedia equipped computers have decreased in the past years, the cost differential currently still approaches several hundred dollars. If the business does not absolutely need the multimedia capability, the choice of the ten non-multimedia computers is most logical.

Multimedia computers are thus seldom used or needed in the business environment.

Mixed-media Message Servers

Mixed-media message computer servers allow users to create, store, and send mixed-media messages to other users, via a computer network. Mixed-media messages are defined herein as messages, such as electronic mail (e-mail) messages (text), that include associated sound recordings, such as a voice message. Other possible combinations of media are facsimile (fax) transmissions associated with sound recordings, animation with sound, text, and music, etc.

In a typical work environment, the general concept of mixed-media messages is known. For example, take the situation of an editor returning a marked-up document to a writer. The editor may hand the document with the changes to the writer and at the same time the editor may say, "Please revise the second section, in general, your tone was too . . . " In this example, the editor has given the writer a marked-up document (a first media) and verbal comments (a second media), thus a mixed-media message. Although the editor could have sent the document to the writer with a memo including the same contents as the verbal comments, it is believed that most people prefer to make verbal comments. Some common reasons why verbal comments are believed to be preferred over written documents include that it is easier and quicker to convey information, it is typically less formal, and it allows for spontaneous or last minute changes and ideas, and it carries the emotion of the speaker.

In the example above, if the editor and the writer are in offices in two different cities, most likely the editor would send the writer the marked-up document via inter-office mail, or via e-mail. However the editor would have to resort to another method in order to give the writer the verbal comments.

One method the editor could use is calling the writer directly on the phone, and if the writer were not in, the editor could leave the writer a voice-mail message. A drawback with this method is that the editor's phone call, or message, is separated from the relevant document. Although the editor may refer to the marked-up document, the writer may not fully understand the editor's comments until he reviews the changes in the document. Further, when the writer receives the document, the writer may have forgotten or lost the editor's voice message. Another problem is that since the phone call is separated from the document, the writer may think the editor is referring to an entirely different document. Thus, as illustrated, the lack of connection between the two closely related messages has drawbacks.

A method is available to users only if both the users have multimedia computers. In this special case, the editor uses her multimedia computer's microphone and sound card to digitize a voice message and attaches the recorded message to the revised document. This mixed-media message is then sent to the writer. Upon receipt of the multi-media message, the writer uses his multimedia computer's speakers and sound card to play the digitized voice message. A drawback with this method is that if the writer does not have a multimedia computer, the attached recorded message is meaningless.

FIG. 1 illustrates a system including multimedia computers described immediately above. FIG. 1 illustrates multimedia computers 100 and 110 and e-mail servers 120 and 130. Multimedia computer 100 is coupled to e-mail server 120 by LAN 140 and multimedia computer 110 is coupled to e-mail server 130 by LAN 150. E-mail servers 120 and 130 are coupled to each other through a network such as the Internet. Multimedia computers 100 and 110 include digital sound boards (not shown), speakers 160 and 170, and microphones 180 and 190, respectively.

In the method described above, a user uses multimedia computer 100 to generate a message such as an e-mail message. The user may then use microphone 180 and the sound board on multimedia computer 100 to record a voice message. Using client software resident on multimedia computer 100, the two messages are combined into one mixed-media message.

Once this mixed-media message is generated in multimedia computer 100, the message may be sent to multimedia computer 110, via e-mail servers 120 and 130, and the internet. When a user receives the mixed media message on multimedia computer 110, the user may read the message and play the voice message on the sound board and speaker 170. For the business environment, because multimedia computers are not common, as explained above, the described method has very limited usefulness.

A further enhancement to messaging, is also shown in FIG. 1. FIG. 1 illustrates a telephone line 180 coupled to a voice-mail server 190. Voice-mail server 190, may include conventional well-known voice-mail features, and as illustrated, voice mail server 190 and e-mail server 120 can be resident on the same computer.

In operation, a telephone call, either external or internal may be routed to voice-mail server 190. Voice-mail server 190 digitizes and records a voice-mail message. Next, e-mail server 120 generates an e-mail message incorporating only the digitized voice-mail message. The user thus is made aware of a voice-mail message by the user's e-mail system.

To listen to the message, a user at multimedia computer 100, may play the voice-mail message through the sound board and speakers 160. Alternatively, the user may dial-up voice-mail server 190 in a conventional manner to listen to the message.

What is needed is an apparatus and a method of use for enabling mixed-media messaging using resources more commonly available in a business environment and for enabling Internet-based telephone for a business environment.

SUMMARY OF THE INVENTION

The present invention discloses methods and apparatus for recording mixed-media messages using an integrated messaging server in response to a client application, the integrated messaging server including a processor coupled to a telephone switching server, to a storage, and to a message server, the method includes the steps of receiving a voice message using a handset coupled with an analog line to the telephone switching server and storing the voice message in the storage. The method also includes the steps of receiving a message from the client application using the message server and associating the voice message with the message to form a mixed-media message.

According to another embodiment of the present invention, an integrated messaging server for recording mixed-media messages in response to a client application and a telephone handset includes a telephone switching server coupled to the telephone handset for receiving a voice message, a storage coupled to the telephone switching server for storing the voice message, and a message server coupled to the storage for receiving an electronic mail message from the client application and for associating the electronic mail message and the voice message to form a mixed-media message.

According to yet another embodiment of the present invention, a computer system including a computer program for recording mixed-media messages in response to a client application and a telephone handset, the computer program including a processor coupled to a telephone switching server, to a storage, and to a message server, includes a computer-readable memory including code that directs a handset coupled with an analog line to the telephone switching server to receive a voice message, code that directs the storage to store the voice message, code that directs the message server to receive a document from the client application, and code that directs the message server to associate the voice message with the document to form a mixed-media message.

Further understanding of the nature and advantages of the invention may be realized by reference to the remaining portions of the specification and drawings.

DESCRIPTION OF SPECIFIC EMBODIMENTS

System Overview

Figure 1:
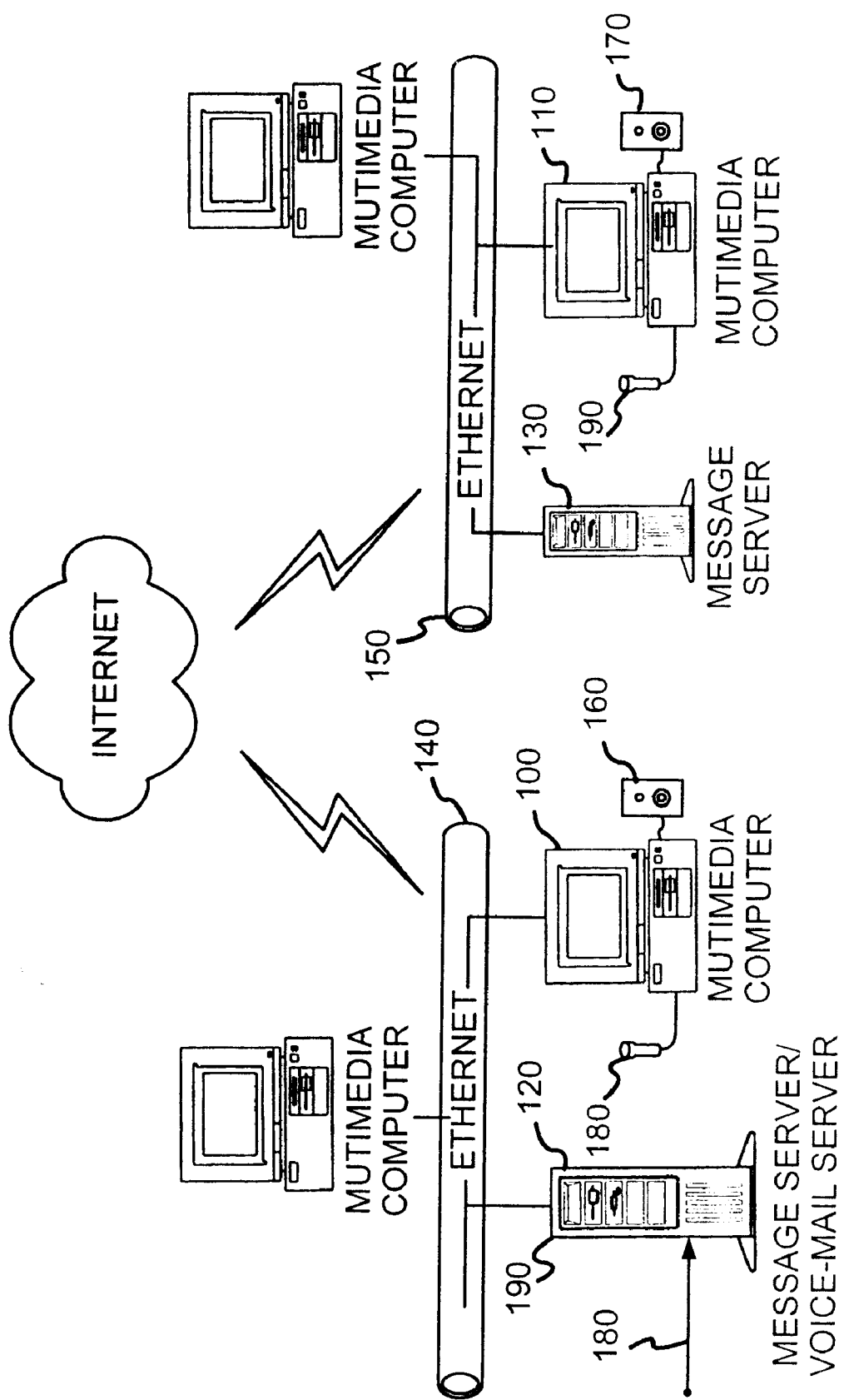
FIG. 1 is illustrates a system including multimedia computers.
Figure 2:
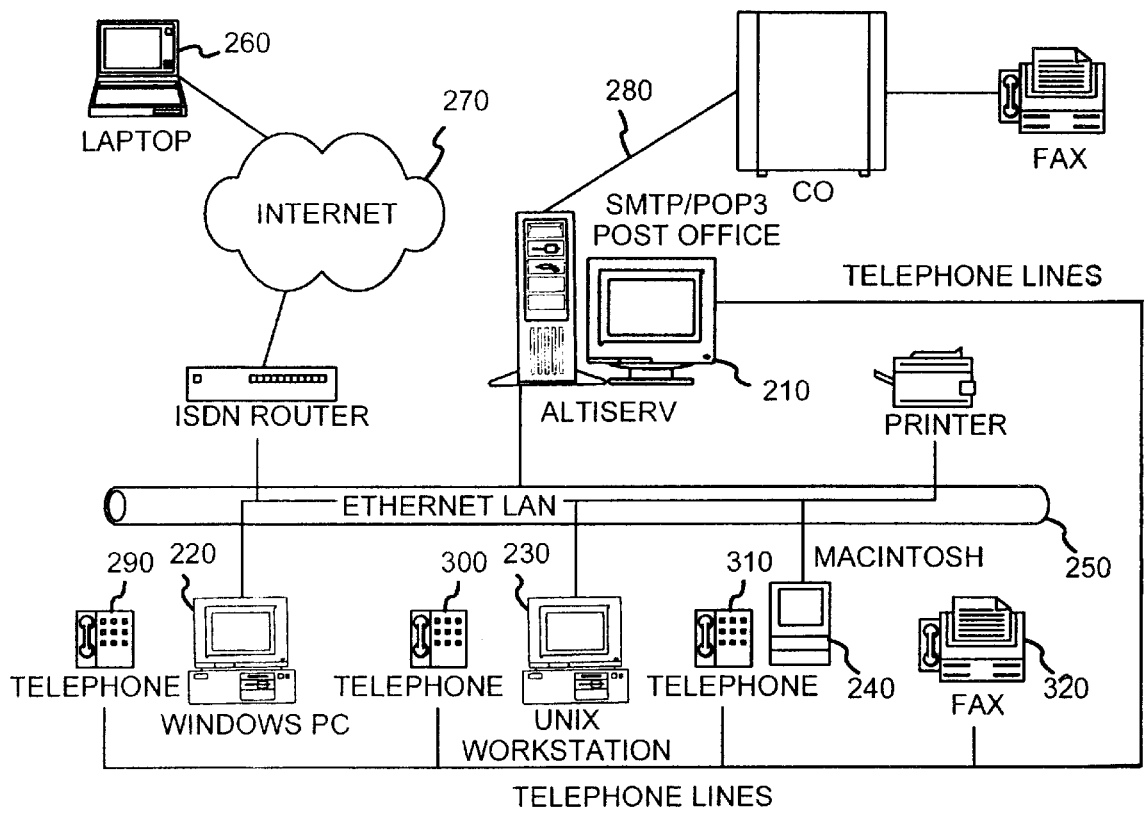
FIG. 2 is a overview of a typical system according to a preferred embodiment of the present invention.

FIG. 2 is a overview of a typical system 200 including a preferred embodiment of the present invention. The present invention is preferably embodied as an AltiServ™ server integrating messaging system 210 from AltiGen Communications, Inc. System 200 includes a plurality of computers 220–240, typically not having multimedia capability (i.e. no digital sound card, external speakers or microphone), coupled to a network 250 such as an ethernet. Remote computer 260 may be coupled to network 260 via the Internet 270. Integrated messaging system 210 is coupled to telephone trunk lines 280 and to network 250. Integrated messaging system 210 is also coupled to telephone handsets 290–310 and to facsimile machine (FAX) 320.

As shown, computers 220–240 may be any typical make or model of computer. What is preferred is that computers 220–240 have an e-mail client application that supports well-known SMTP and MIME standards.

Figure 3:
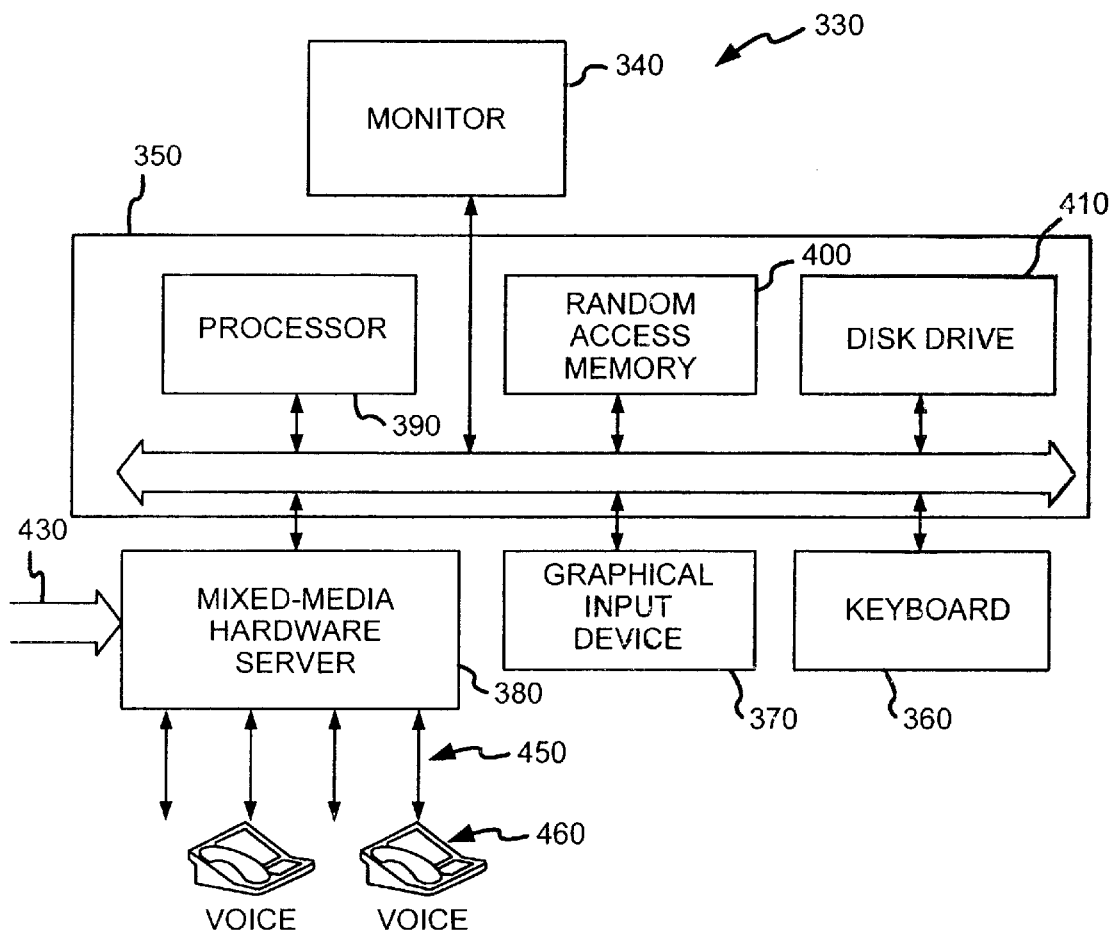
FIG. 3 is a block diagram of a system according to a preferred embodiment of the present invention.

FIG. 3 is a block diagram of an integrated messaging system 330 according to a preferred embodiment of the present invention. Integrated messaging system 330 includes a monitor 340, a computer 350, a keyboard 360, a graphical input device 370, and a mixed-media hardware server 380. Computer 350 includes familiar computer components such as a processor 390, and memory storage devices, such as a random access memory (RAM) 400, a disk drive 410, and a system bus 420 interconnecting the above components. A telephone trunk line 430 and individual telephone lines 450 are coupled to mixed-media hardware server 380. Handsets 460 may be coupled to individual telephone lines 450.

Handsets 460 are preferably analog signal handsets, however alternatively they may be any well known type of digital or analog telephone handset. A mouse is but one example of graphical input device 370, also known as a pointing device, a trackball is another. RAM 400 and disk drive 410 are examples of tangible media for storage of computer programs such as embodiments of the herein described methods. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, System 330 includes a IBM PC compatible computer having a '586-class based microprocessor, such a Pentium™ from Intel Corporation, running WindowsNT™ from Microsoft Corporation, and AltiWare™ software from AltiGen Communications, Inc. Mixed-media hardware server 380 is preferably embodied as a Quantum™ hardware mixed-media PCI based PC board from AltiGen Communications, Inc.

FIG. 3 is representative of but one type of system for embodying the present invention. It will be readily apparent to one of ordinary skill in the art that many system types and software configurations are suitable for use in conjunction with the present invention.

Hardware Description

Figure 4:
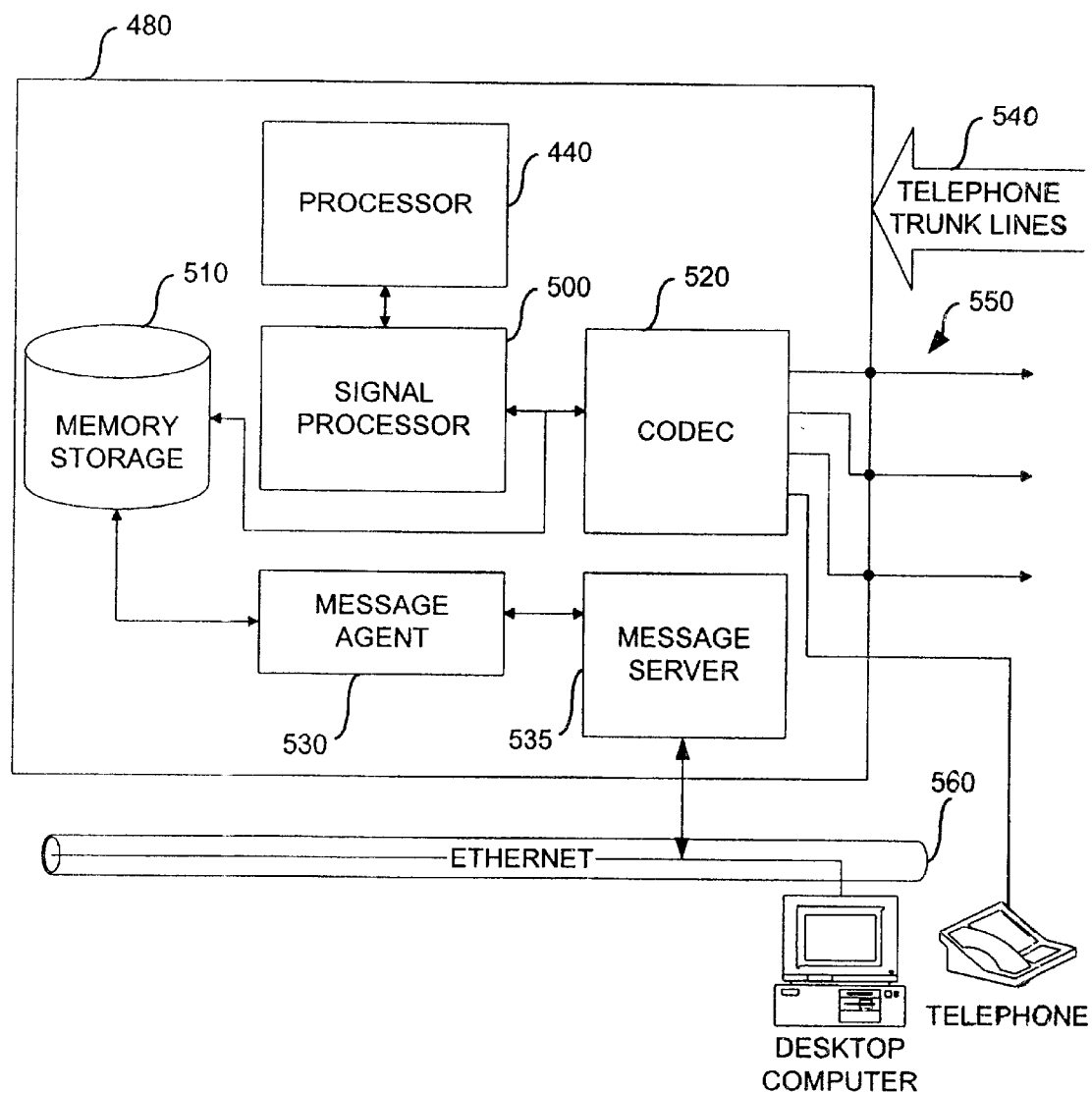
FIG. 4 is a more detailed block diagram of a system according to a preferred embodiment of the present invention.

FIG. 4 is a more detailed block diagram of a portion of an integrated messaging system 480 according to a preferred embodiment of the present invention. Integrated messaging system 480 includes a processor 490, a signal processor 500, a memory storage 510, a digital to analog and analog to digital coder (codec) 520, a message agent 530, and a message server 535. System 480 interfaces with telephone trunk lines 540 and with telephone extension lines 550. System 480 also interfaces to a local area network (LAN) 560. Telephone Handset 565 is coupled to one of telephone extension lines 550.

Processor 490 typically controls the operation of integrated messaging system 480 according to the AltiWare™ software, as previously described. In a preferred embodiment of the present invention, AltiWare™ software, operates in a multi-threaded multi-tasking environment, with each thread monitoring the status of a particular telephone extension line. The status of the particular telephone extension line is represented as a state machine in the software.

Signal processor 500 preferably comprises Texas Instruments TMS320C5X digital signal processors (DSPs), and is coupled to processor 490 as illustrated. In the preferred embodiment, signal processor 500 provides the functionality of a telephone switching system to each telephone extension line. In particular, signal processor 500 detects off-hook conditions, provides tone generation, and detects and processes tones from each handset, etc. Signal processor 500 also operates in a multi-process environment with each process monitoring the status of a particular telephone extension line. In a preferred embodiment of the present invention, signal processor 500 process up to twelve telephone extension lines being simultaneously off-hook. The status of the particular telephone extension line is represented as a state machine within the signal processor 500.

Memory storage 510 is typically used to store voice messages, e-mail and mixed media messages received from other blocks. Within this high-level view, memory storage 510 preferably includes techniques that convert and store incoming voice messages in two specific storage formats. One format uses a well-known Windows ".wav" file format, and the other uses a pulse coded modulation scheme (PCM) to store the message. Other formats for storage of audio messages or samples are known to those of ordinary skill in the art and also contemplated within alternative embodiments of the present invention, such as the "RealAudio" format.

Message server 535 is typically a software process that runs upon processor 490. Message server 535 is preferably on an electronic mail (e-mail) server that is compliant with industry standard mail protocols such as SMTP or ESMTP. Message servers such as message server 535 are well known in the art.

Message agent 530 is typically a software process also that runs upon processor 490. Message agent 530 receives messages such as e-mail messages from message server 535 and also retrieves voice messages, from memory storage 510. Message agent 530 combines the messages to form a mixed-media message for storage in memory storage 510. In a preferred embodiment of the present invention, message server 535 constructs a Multipurpose Internet Mail extension (MIME) compliant message including the voice message in the different audio formats described above. Typically message server 535 and message agent 530 are collectively referred to as a messaging system.

Codec 520 is used to digitize analog signals from telephone extension lines 550, and is used to convert digital signals into analog signals for telephone extension lines 550. As mentioned above, codec 520 is coupled to send and receive tones compatible with customary telephone switching systems. Further codec 520 is used to provide voice prompting capability for telephone extension lines 550. For example, prompting the user to select certain keys for voice mail functions, or for telephone switching configuration options.

Recording Mixed-media Messages

Figure 5:
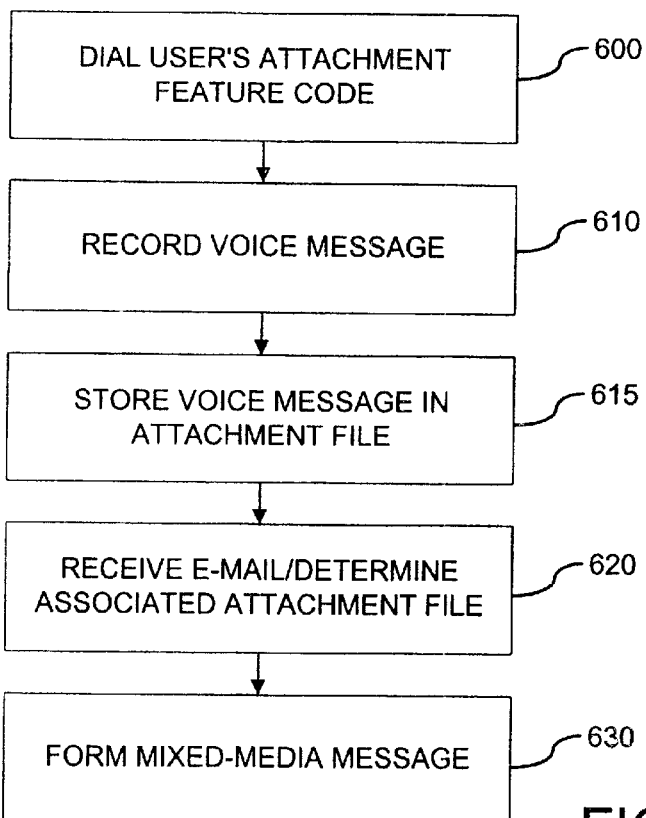
FIG. 5 illustrates an overview flow diagram of a preferred embodiment of the present invention.

FIG. 5 illustrates an overview flow diagram of a preferred embodiment of the present invention.

Initially a user uses a telephone handset to dial a predetermined "attachment" feature code, step 600 preferably an extension number as will be explained below. Next, typically in response to a voice prompt, the user records a voice message, step 610. In a preferred embodiment of the present invention, the system digitizes the voice message and places the recorded message in an "attachment" area (a directory or file), associated with the user, step 615. Then when the user sends an e-mail message to the system, the system determines whether there is a recorded message in the "attachment" area associated with the user, step 620. If so, the system forms a mixed-media message by combining the e-mail message and the recorded message, step 630.

Figure 6:
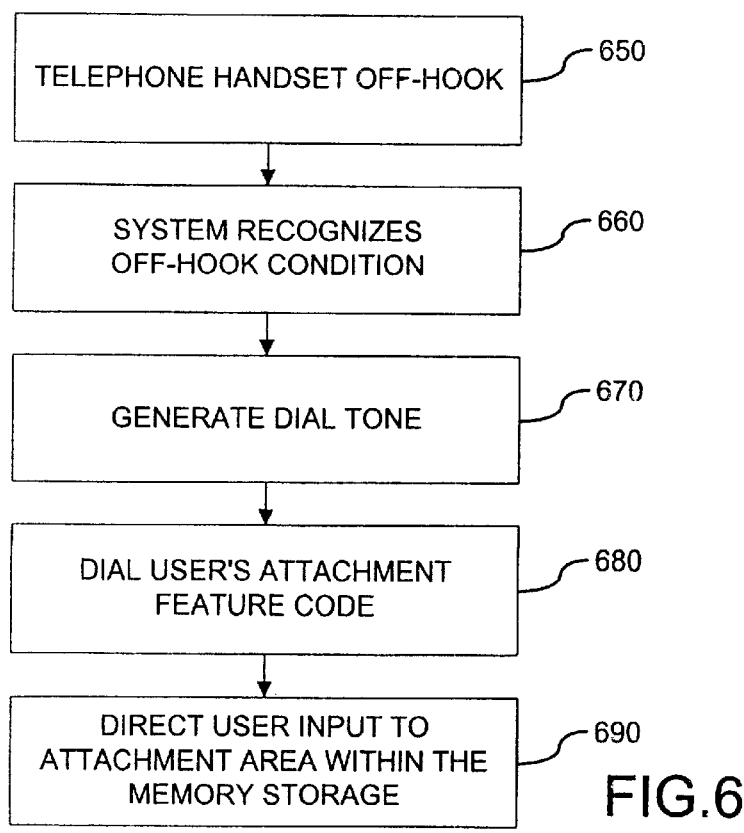
FIG. 6 illustrates a more detailed flow diagram of a step in a preferred embodiment of the present invention referring to FIG. 4.

FIG. 6 illustrates a more detailed flow diagram of step 600 in a preferred embodiment of the present invention referring to FIG. 4.

Initially the user goes off-hook with telephone handset 565, step 650. For example, removing the telephone handset from the cradle or entering a speaker phone mode. The signal processor 500, which is a polling state, recognizes that telephone handset 565 is in an off-hook condition, step 660, and in response, signal processor 500 preferably generates a dial tone to telephone handset 565, through codec 520, step 670. The user then enters a feature code that has been predefined as an "attachment" area for her personal use. Typically the user can select a feature code by entering a telephone extension number on a telephone handset 565, step 680. Alternative methods including voice commands and voice recognition software are also contemplated as selection methods. In response, signal processor 500 recognizes the feature code, and then initializes from the telephone extension line through codec 520 to memory storage 510, step 690.

Figure 7:
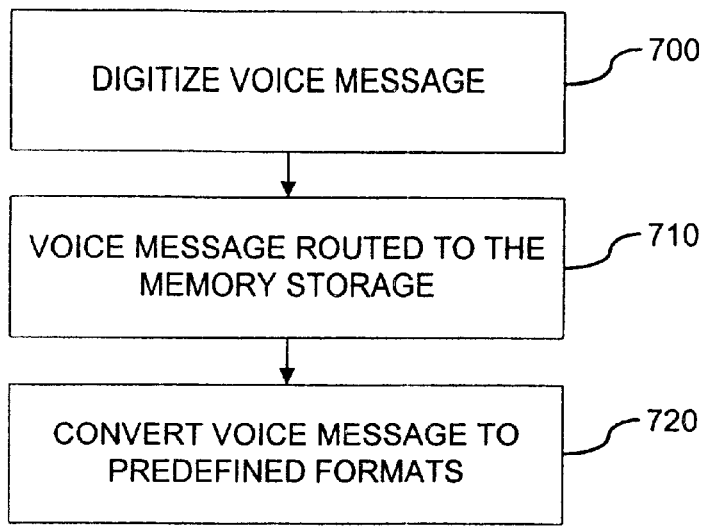
FIG. 7 illustrates a more detailed flow diagram of a step in a preferred embodiment of the present invention referring to FIG. 4.

FIG. 7 illustrates a more detailed flow diagram of step 610 in a preferred embodiment of the present invention referring to FIG. 4.

As the user speaks into the telephone handset 565, her voice is initially digitized by codec 520, typically into a serial stream of data using a pulse coded modulation (PCM) scheme, step 700. Any conventional codec can be used to digitize the incoming signal. In the preferred embodiment of the present invention a conventional codec is used. The serial stream of data, the recorded message, is then typically passed to memory storage 510, step 710. Memory storage 510 preferably stores the stream of PCM data, step 720. Many of the modulation and compression schemes can be used to process the incoming signals and are contemplated in alternative embodiments of the present invention.

Memory storage 510 preferably stores these files into the "attachment" area specified by the user, step 615.

Figure 8:
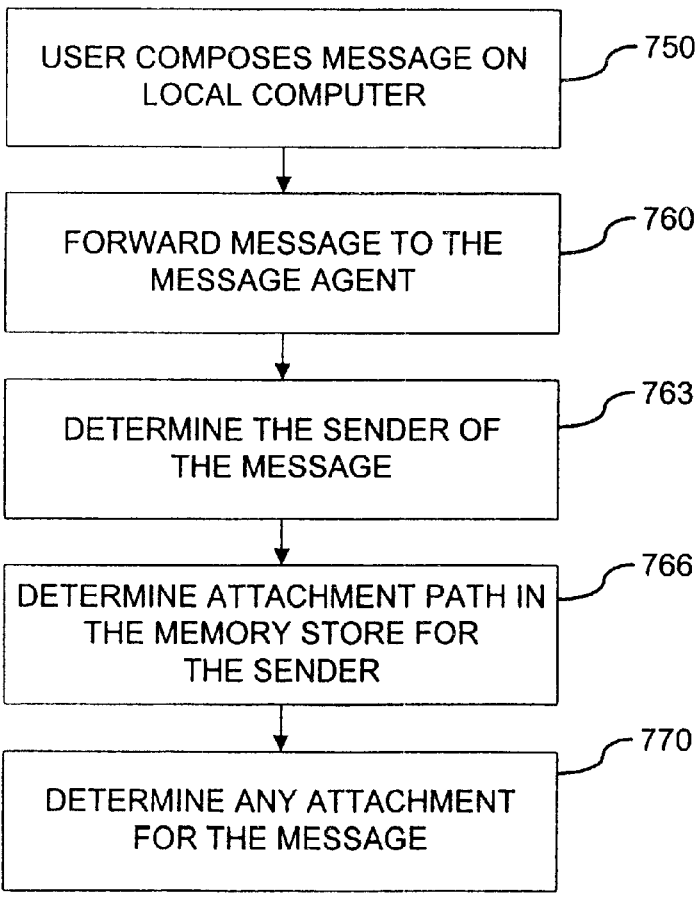
FIG. 8 illustrates a more detailed flow diagram of a step in a preferred embodiment of the present invention referring to FIG. 4.

FIG. 8 illustrates a more detailed flow diagram of step 620 in a preferred embodiment of the present invention referring to FIG. 4.

On the user's local computer, the user preferably reads, composes, forwards, etc. "documents" such as electronic messages e.g., e-mail messages, using any industry standard client software, step 750. Preferably the client software is POP3 or IMAP4 compliant, however, any other industry standard client software is also contemplated and included in alternative embodiments of the present invention. After the message is formed, the client software forwards the message to message agent 530 via message server 535 over LAN 560, step 760. In response, message agent 530 determines who the sender of the message is, step 763. Next message agent 530 determines the attachment location in memory for the sender, step 766, and then determines whether there are any recorded messages in the attachment area within memory storage 510, step 770.

Figure 9:
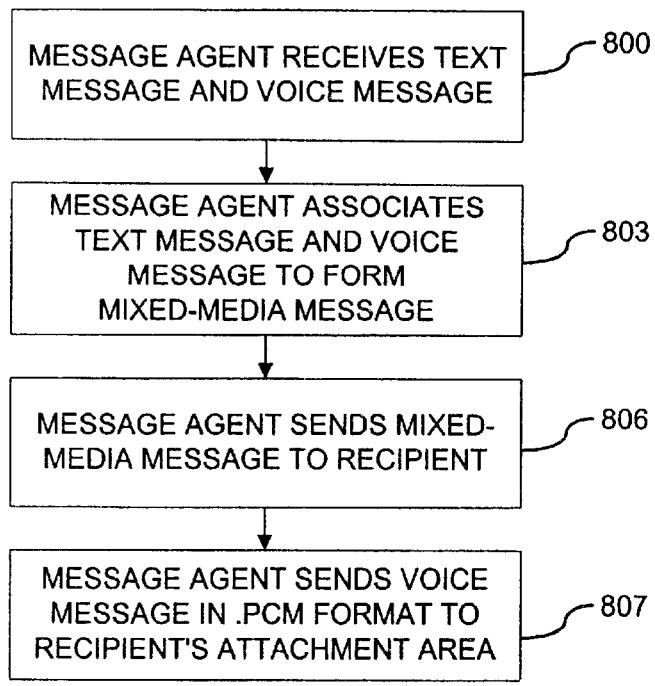
FIG. 9 illustrates a more detailed flow diagram of a step in a preferred embodiment of the present invention referring to FIG. 4.

FIG. 9 illustrates a more detailed flow diagram of step 630 in a preferred embodiment of the present invention referring to FIG. 4.

In the preferred embodiment of the present invention, message agent 530 receives the electronic message and retrieves the recorded message, step 800. Message agent 530 associates the e-mail message and the recorded message to form a mixed-media message which is preferably stored back into memory storage 510, step 803. Preferably, message agent 530 formats the mixed media message as an e-mail having MIME multipart/alternative with content type of "audio/wave" and/or "audio/x-altivpath" for the audio attachments. Message agent 530 then sends the mixed-media message to the recipient, step 806. In the preferred embodiment, both a .WAV format and a PCM format voice message are included in a transmitted message. Preferably, if the recipient has a mixed media server, as described herein the recorded message (the PCM file) is stored in a separate "attachment" area of memory storage for later retrieval, step 807.

In alternative embodiments of the present invention, only one voice message attachment is provided, for example a PCM format message. In another embodiment of the present invention, the voice message files need not have been created by the user, the audio attachment file may be originally created by another user. For example, the user may transfer a voice-mail message she previously received into her attachment area. In such a case, the user may then create an e-mail message with text having the voice-mail message as an attachment.

Retrieving Mixed-media Messages

Figure 10:
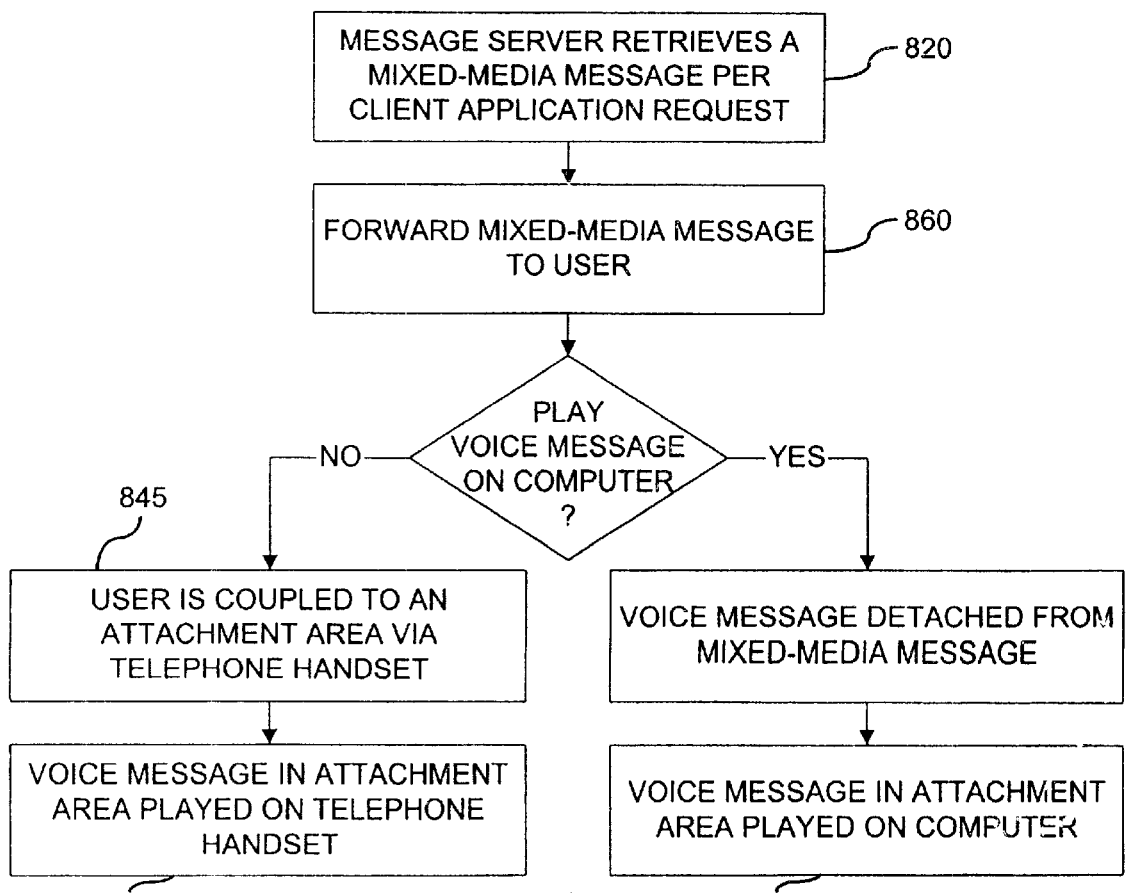
FIG. 10 illustrates an overview flow diagram of a preferred embodiment of the present invention.

FIG. 10 illustrates an overview flow diagram of a preferred embodiment of the present invention.

A user who receives a mixed-media message formed, as described above, has two options to play audio attachments.

One option is to play the audio attachment via the speakers attached to the user's computer. The second option is to play the audio attachment via the handset of the user's telephone. The second option is the only option if the user's computer is not equipped with speakers.

In the case the recipient has a system similar to that illustrated in FIG. 4, the message server 535 retrieves a mixed-media message to a recipient upon request, 820. The mixed media then forwards the message to the user, step 860. The receiver is made aware that the message is mixed-media type, and includes a voice message attachment by the header information. The user preferably then uses telephone handset 565 and dials a feature code that connects her telephone to her attachment area, as previously described, step 845. The message is then played on telephone handset 565, step 850.

In the case the user has a multimedia computer and chooses to play the audio attachment over the speakers, the message server forwards the entire mixed-media message to the user. To listen to the message, the user then invokes any standard audio player, to play the ".wav" file, or other standard audio file attachment, step 870. In this situation the PCM file attachment is simply ignored.

Internet Based Telephony

Figure 11:
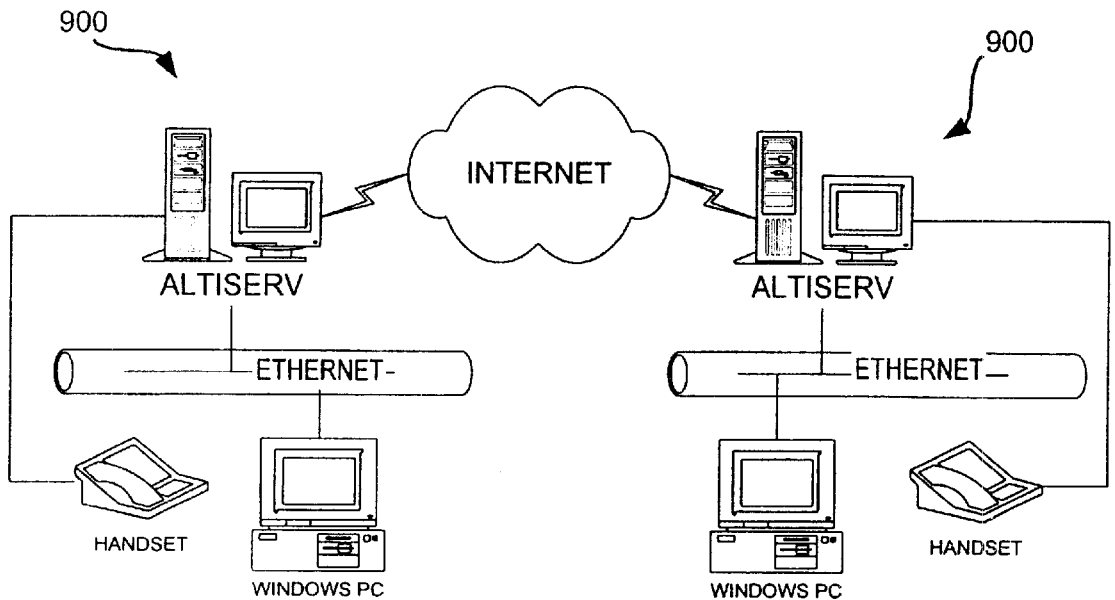
FIG. 11 illustrates a system according to a preferred embodiment of the present invention providing internet-based telephony.

FIG. 11 illustrates a system according to a preferred embodiment of the present invention providing internet-based telephony. In the preferred embodiment, sender's system 900 and the receiver's system 910 are each preferably configured according to FIG. 4. The preferred embodiment provides business the ability to utilize the internet for making long-distance calls.

Figure 12:
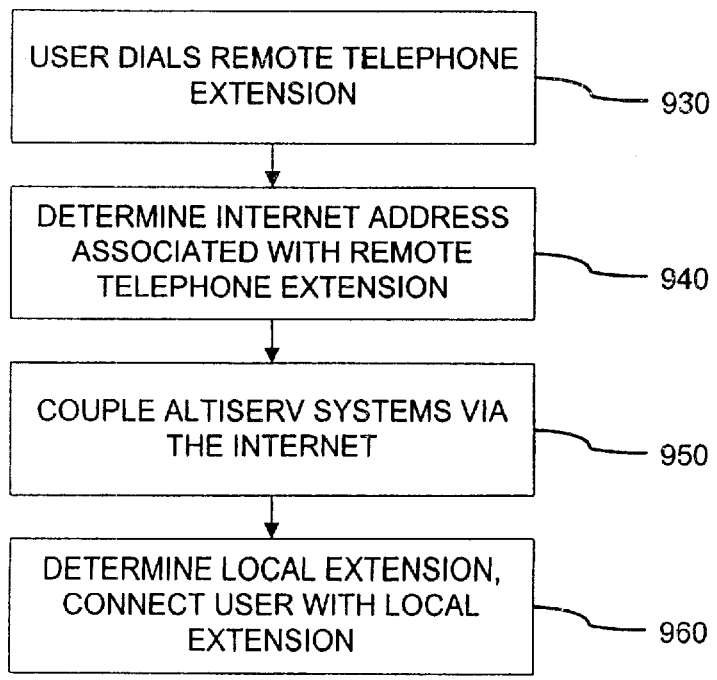
FIG. 12 illustrates an overview flow diagram of a preferred embodiment of the present referring to FIG. 4.

FIG. 12 illustrates an overview flow diagram of a preferred embodiment of the present referring to FIG. 4.

Initially a user, caller, dials a telephone extension number of another person, receiver, step 930. In response to the extension, system 900 determines the internet address of the receiver, step 940. Through the internet, preferably using industry standard TCP/IP protocols, system 900 is then coupled to a system 910 of the receiver, step 950. In response to the information transferred from system 900, for example the extension number, system 910 determines the local telephone extension of the person being called, and connects the user to that extension, step 960.

Figure 13:
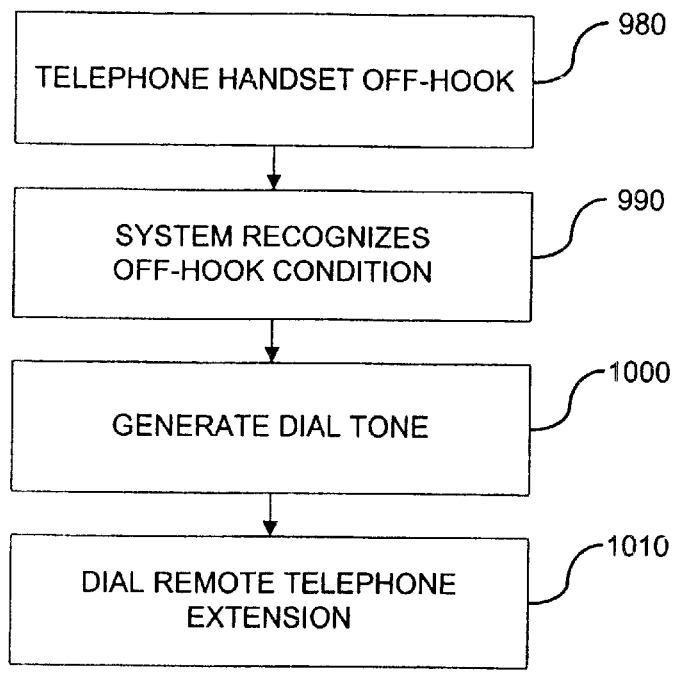
FIG. 13 illustrates a more detailed flow diagram of a step in a preferred embodiment of the present invention referring to FIG. 4.

FIG. 13 illustrates a more detailed flow diagram of step 930 in a preferred embodiment of the present invention referring to FIG. 4.

Initially the user goes off-hook with telephone handset 565, step 980. The signal processor 500, which is a polling state, recognizes that telephone handset 565 is in an off-hook condition, step 990, and in response, signal processor 500 generates a dial tone to telephone handset 565, through codec 520, step 1000. The user then enters an extension number of the user she wishes to talk to, typically with a telephone handset, step 1010.

Figure 14:
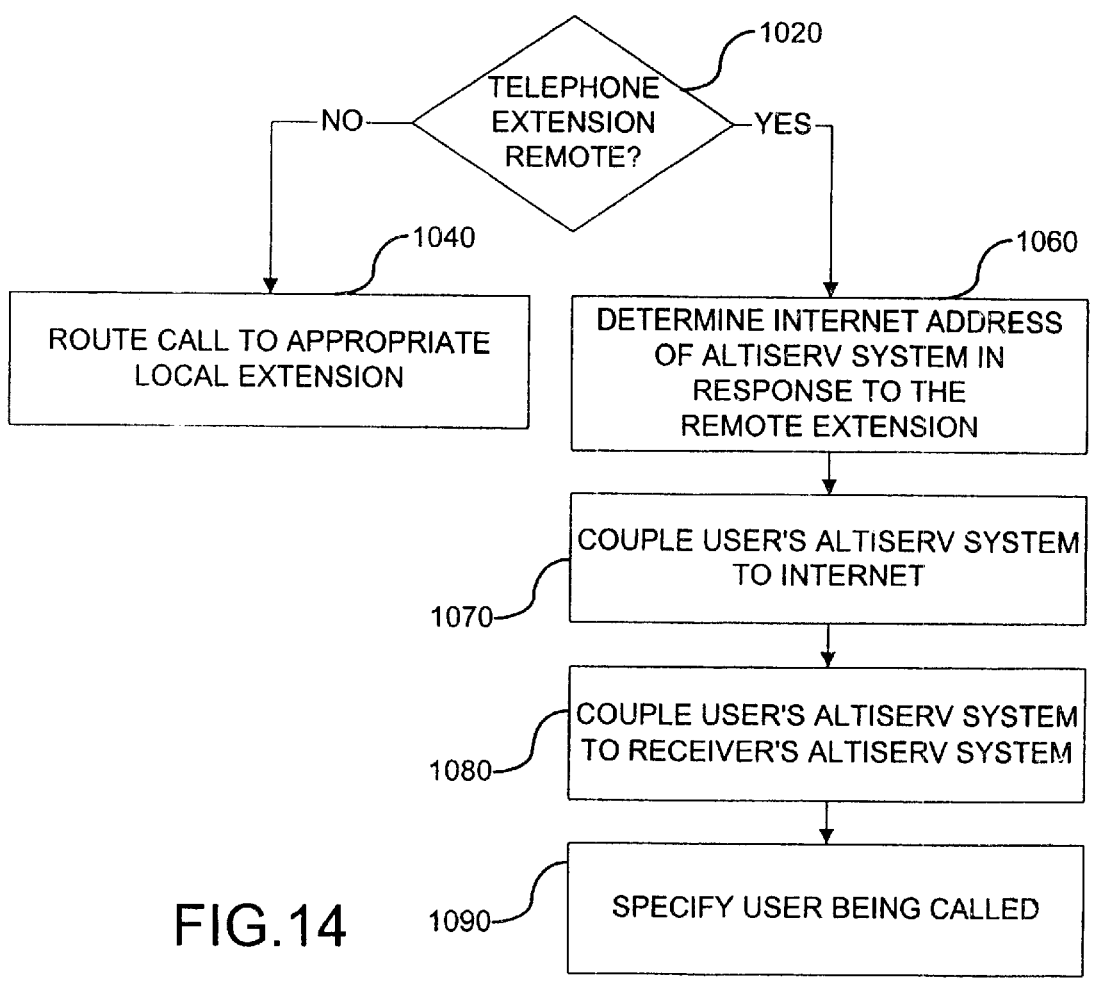
FIG. 14 illustrates a more detailed flow diagram of steps in a preferred embodiment of the present invention referring to FIG. 4.

FIG. 14 illustrates a more detailed flow diagram of steps 940 and 950 in a preferred embodiment of the present invention referring to FIG. 4.

When signal processor 500 receives the extension number, it passes the extension number to a process running in the processor 490. The process determines whether that extension is one of the local telephone extension lines 550, step 1020. If the extension number is one of telephone extension lines 550, such as a telephone handset line, voice-mail in-box, or attachment area, signal processor 500 routes the call to the appropriate extension, step 1040.

If the extension number is not within the available local telephone extension lines, signal processor 500 accesses memory storage 510 to determine where the call should be routed to. One possible routing is to an internet address or to a domain name, step 1060. Unlike private individuals, because businesses typically can afford their own dedicated internet addresses, that unique internet address can be easily specified and is preferably stored in memory storage 510.

In response to the internet address or domain name, system 900 is coupled to the internet preferably on a separate data line via a router, step 1070. Once connection between system 900 and system 910 has been made, step 1080, preferably system 900 transmits control codes specifying the person being called, step 1090. The control codes may be an extension, a name, etc.

Figure 15:
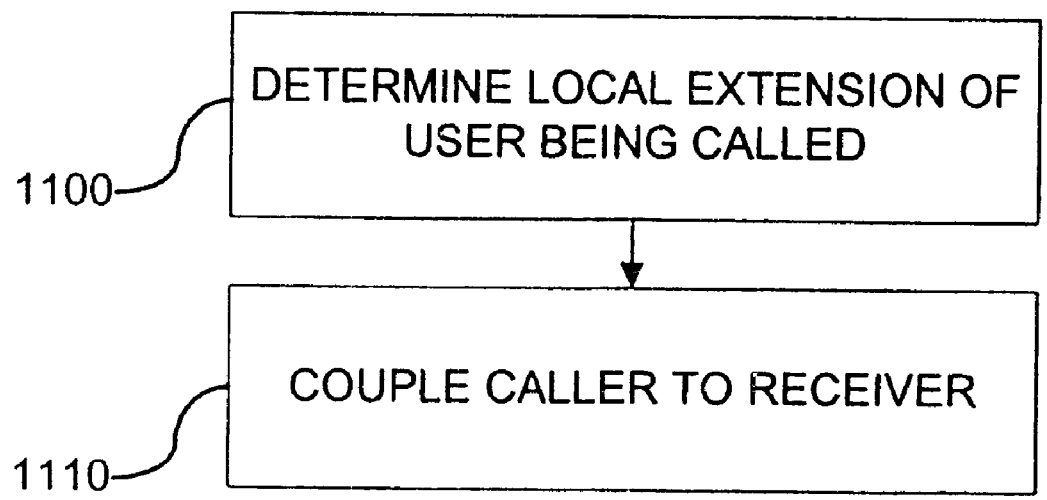
FIG. 15 illustrates a more detailed flow diagram of a step in a preferred embodiment of the present invention referring to FIG. 4.

FIG. 15 illustrates a more detailed flow diagram of step 960 in a preferred embodiment of the present invention referring to FIG. 4.

In response to control codes sent across the Internet, system 910 recognizes that the message is from a compatible system and determines the local extension number of the receiver, step 1100. System 910 then attempts to connect the call to the local extension number, step 1110. Because the systems preferably comply with TCP/IP standards, packets of voice data from the caller will arrive at the receiver in the correct order.

In alternative embodiments of the present invention, instead of dialing an extension to initiate the phone call, the user may simply click a name of the party called on a computer screen. In response the system may recognize the name and proceed to initiate the phone call through the internet, as described above. Once the systems connect, the sending system may transmit the name of the receiver. In response, the receiving system may recognize the name and locate and call the appropriate extension. Once the connection is made, both parties' phones may ring, and the conversation may proceed. In an alternative embodiment of the present invention, the step of transmitting the name or the telephone extension may be combined into the step of making initial contact between the two systems.

Conclusion

In the foregoing specification, the invention has been described with reference to specific exemplary embodiments thereof. Many changes or modifications are readily envisioned. For example, telephone handsets may include speaker phones, headset phones, analog or digital handsets, etc. Further, other types of media for mixed-media messaging include voice messages and FAX transmissions, FAX transmissions and e-mail messages, voice-mail messages and e-mail messages, etc.

An e-mail message may also be text alone, text and an image, an image alone, a presentation with images, text and audio narration or accompaniment, or any other data converted for transmittal via an electronic mail system. A recorded message can be a voice message, music, a sound recording, or any other data converted to an audio form.

In an alternative embodiment of the present invention, secure communications are facilitated, by converting a message into a text message and a voice message for transmittal.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for an integrated computer server, the integrated computer server including a processor and a storage the method comprising:

coupling a telephone handset directly to the integrated computer server, the integrated computer server including a text-based message server portion;

coupling the integrated computer server to a computer via a computer network;

receiving a voice message from a user at the telephone handset that is directly coupled to the integrated computer server in the;

storing the voice message in the storage;

receiving a text-based message from the user from the computer from the computer network in the message server portion of the integrated computer server, the text based message comprising routing instructions and a written message portion entered by the user; and associating the voice message with the text-based message to form a mixed-media message.

2. The method of claim 1, further comprising transferring the mixed-media message in response to the routing instructions.

3. The method of claim 1, wherein the text-based message is an electronic mail message, and wherein the routing instructions comprise e-mail addresses.

4. The method of claim 1, wherein the message portion comprises document.

5. The method of claim 3, wherein the mixed-media message is MIME compliant.

6. The method of claim 3, wherein the message system is SMTP compliant.

7. The method of claim 1, further comprising:

receiving the mixed-media message in a second integrated computer server that includes a processor and a storage;

coupling the second integrated computer server directly to a second telephone handset;

coupling the second integrated computer server to a second computer via a second computer network;

storing the voice message in the storage of the second integrated computer server;

transmitting the text-based message to the second computer via the second computer network; and playing the voice message to the second telephone handset directly coupled to the second integrated computer server.

8. The method of claim 1, further comprising:

coupling the integrated computer server directly to a telephone trunk line.

9. The method of claim 1, wherein storing the voice message in the storage includes:

storing the voice message in a first format and a second format in the storage.

10. The method of claim 7, wherein storing the voice message in the storage of the second integrated computer server includes storing the voice message in a first format and a second format in the storage; and wherein playing the voice message to the second telephone handset comprises transmitting the voice message in the first format to the second handset directly coupled to the second integrated computer server.

11. The method of claim 1 wherein the integrated computer server comprises a message server and a message agent;

wherein receiving a text-based message from the computer includes receiving the text-based message from a client application using the message server; and wherein associating the voice message with the text-based message includes using the message agent to associate the voice message with the message.

12. An integrated messaging server for recording mixed-media messages from a client application, the integrated messaging server comprising:

a handset directly coupled to the integrated messaging server configured to input a voice message from a user;

a storage configured to store the voice message;

a message server coupled to the client application configured to receive a text-based message from a user via the client application, the text-based message comprising routing instructions and a message portion; and a message agent coupled to the storage and to the message server for associating the voice message from the user and the text-based message from the user to form the mixed-media message.

13. The integrated messaging server of claim 12 wherein the client application is compatible with POP3 protocols.

14. The integrated messaging server of claim 12, wherein the integrated messaging server is directly coupled to a telephone trunk line.

15. The integrated messaging server of claim 12, wherein the message server is SMTP compliant.

16. The integrated messaging server of claim 12, wherein the message agent forms MIME compliant mixed-media messages.

17. The integrated messaging server of claim 12, wherein the text-based message is an electronic mail message, and the routing instructions comprise an e-mail address.

18. The messaging server of claim 17, wherein the message portion comprises a document.

19. A messaging server for recording mixed-media messages comprises:

a switching portion directly coupled to a telephone handset, the telephone handset configured to receive a voice message from a sender;

a storage, coupled to the switching portion configured to store the voice message; and a message agent coupled to the storage configured to receive an electronic mail message from a sender via a client application on a computer and configured to associate the electronic mail message from the sender and the voice message from the sender to form a mixed-media message, the electronic mail message comprising address data and a text message portion.

20. The messaging server of claim 19, wherein the storage stores the voice message in a digital format.

21. The messaging server of claim 19, wherein the message agent forwards the mixed-media message to a receiver.

22. A computer program for recording mixed-media messages in a computer system including a processor, and a storage, comprising:

code that directs the processor to receive a voice message from a user at a telephone handset directly coupled to the computer system;

code that directs the processor to store the voice message in the storage;

code that directs the processor to receive a text-based message from a user at a client application from a computer, the text-based message comprising routing data and a text message portion; and code that directs the processor to associate the voice message from the user with the text-based message from the user to form a mixed-media message;

wherein the codes reside on a tangible memory.

23. A method for coupling a first messaging server to a second messaging server through a computer network the messaging servers including a telephone switching portion and a processor, the method comprising:

dialing a telephone number using a telephone coupled via first telephone lines to a telephone switching portion of the first messaging server, the dialing comprising a series of telephone line switching signals;

using a processor of the first messaging server to determine a computer network address and control codes, in response to the telephone number;

contacting the second messaging server through the computer network in response to the computer network address;

receiving in a processor of the second messaging server the control codes from the first messaging server;

using a telephone switch portion of the second messaging server to determine a telephone extension coupled via second telephone lines thereto in response to the control codes; and coupling the telephone coupled to the first messaging server to a telephone coupled to the telephone extension to provide synchronous communications between the telephones via the first telephone line, via the second telephone line and via the computer network.

24. The method of claim 23 wherein the computer network address comprises an internet address.

25. The method of claim 23 wherein the computer network address comprises an internet domain name.

26. The method of claim 23 wherein the computer network comprises the Internet.

27. The method of claim 23 wherein the computer network comprises a local area network.

28. The method of claim 23 wherein the computer network comprises a wide area network.

* * * * *